US008760296B2

(12) United States Patent
Martin

(10) Patent No.: US 8,760,296 B2
(45) Date of Patent: Jun. 24, 2014

(54) ACCESS MONITORING SYSTEMS FOR USE WITH CONSUMER-OPERATED KIOSKS AND OTHER ENCLOSURES

(71) Applicant: Coinstar, Inc., Bellevue, WA (US)

(72) Inventor: Douglas A. Martin, Woodinville, WA (US)

(73) Assignee: Outerwall Inc., Bellevue, WA (US)

( * ) Notice: Subject to any disclaimer, the term of this patent is extended or adjusted under 35 U.S.C. 154(b) by 0 days.

(21) Appl. No.: 13/915,123

(22) Filed: Jun. 11, 2013

(65) Prior Publication Data

US 2013/0307386 A1    Nov. 21, 2013

Related U.S. Application Data

(63) Continuation of application No. 13/229,526, filed on Sep. 9, 2011, now Pat. No. 8,482,413.

(51) Int. Cl.

| | |
|---|---|
| *G08B 13/14* | (2006.01) |
| *G07D 3/14* | (2006.01) |
| *G07F 1/04* | (2006.01) |
| *G07F 9/06* | (2006.01) |
| *G07F 11/00* | (2006.01) |
| *G06K 7/00* | (2006.01) |
| *G06K 19/07* | (2006.01) |
| *G06K 19/077* | (2006.01) |
| *G06Q 10/08* | (2012.01) |

(52) U.S. Cl.
CPC .................. *G07D 3/14* (2013.01); *G07F 1/046* (2013.01); *G07F 9/06* (2013.01); *G07F 11/002* (2013.01); *G06K 7/0008* (2013.01); *G06K 19/0723* (2013.01); *G06K 19/07749* (2013.01); *G06Q 10/08* (2013.01); *G06Q 10/087* (2013.01)
USPC ..... 340/572.1; 194/200; 194/350; 340/545.1; 340/545.2; 340/545.3; 340/545.6; 700/241

(58) Field of Classification Search
CPC ....... G07D 3/14; G07D 11/0066; G07D 9/00; G07F 5/22; G07F 1/046; G07F 5/18; G07F 9/08; G07F 9/06; G07F 9/10; G07F 11/44; G07F 11/002; G07F 9/026; G07F 17/0042; G07F 17/0092; G06Q 10/087; G06Q 10/08; G06K 7/0008; G06K 19/0723; G06K 19/07749; G08B 13/08; G08B 25/008; G08B 13/22; G08B 13/1436; G08B 13/183; G08B 13/19; G08B 13/181; G08B 13/06; E05F 15/20; E05B 45/06; E05B 43/00; E05B 45/125; E05B 65/108; E05Y 2900/132; A47G 29/1214; B65G 2203/10
USPC ................ 194/200, 350; 700/241; 340/572.1, 340/545.1–545.3, 545.6
See application file for complete search history.

(56) References Cited

U.S. PATENT DOCUMENTS

| | | |
|---|---|---|
| 4,278,968 A | 7/1981 | Arnett et al. |
| 5,620,079 A | 4/1997 | Molbak |
| 6,392,537 B1 | 5/2002 | Tazumi et al. |
| 6,494,776 B1 | 12/2002 | Molbak |
| 6,736,251 B2 | 5/2004 | Molbak |
| 6,811,236 B1 | 11/2004 | Spong et al. |
| 7,178,729 B2 * | 2/2007 | Shaffer et al. ................. 235/385 |
| 7,181,369 B2 | 2/2007 | Kanki et al. |
| 7,262,518 B2 | 8/2007 | Nagano et al. |
| 7,319,397 B2 | 1/2008 | Chung et al. |
| 7,527,193 B2 | 5/2009 | Molbak |
| 7,584,869 B2 | 9/2009 | DeLazzer et al. |
| 7,653,599 B2 | 1/2010 | Doran et al. |
| 7,748,619 B2 | 7/2010 | Martin et al. |
| 7,815,071 B2 | 10/2010 | Martin et al. |
| 7,865,432 B2 | 1/2011 | Doran et al. |
| 7,874,478 B2 | 1/2011 | Molbak |
| 8,024,272 B2 | 9/2011 | Doran et al. |
| 8,047,988 B2 | 11/2011 | Lee et al. |
| 8,091,777 B2 | 1/2012 | Takahashi |
| 8,157,162 B2 | 4/2012 | Jonsson et al. |
| 8,225,458 B1 | 7/2012 | Hoffberg |
| 8,482,413 B2 | 7/2013 | Martin |
| 2003/0100373 A1 | 5/2003 | Fujimoto et al. |
| 2005/0010500 A1 | 1/2005 | Coveley |
| 2006/0192001 A1 * | 8/2006 | Shaffer et al. ................. 235/385 |
| 2007/0247276 A1 * | 10/2007 | Murchison et al. ............ 340/5.2 |
| 2007/0247277 A1 * | 10/2007 | Murchison et al. ............ 340/5.2 |

| | | | |
|---|---|---|---|
| 2008/0223930 | A1 | 9/2008 | Rolland et al. |
| 2010/0109852 | A1* | 5/2010 | Bauchot et al. ............ 340/10.51 |
| 2010/0194579 | A1 | 8/2010 | Choi et al. |
| 2010/0225482 | A1 | 9/2010 | Kasai et al. |
| 2011/0042403 | A1 | 2/2011 | Martin |
| 2011/0205058 | A1 | 8/2011 | Phipps et al. |
| 2011/0227705 | A1 | 9/2011 | Khozyainov |
| 2011/0234371 | A1* | 9/2011 | Linton et al. .................... 340/5.7 |
| 2013/0042532 | A1* | 2/2013 | Aragon et al. .................. 49/357 |

FOREIGN PATENT DOCUMENTS

| | | |
|---|---|---|
| EP | 0874335 | 10/1998 |
| EP | 1525908 | 4/2005 |
| EP | 1857986 | 11/2007 |
| EP | 2182581 | 5/2010 |
| WO | WO-2006109944 | 10/2006 |

OTHER PUBLICATIONS

Extended European Search Report for European Application No. EP12183163, Mail Date Jan. 15, 2014, 9 pages.

RFID Basics, "Frequently Asked Questions About RFID", 2011, available at http://www.zebra.com/id/zebra/na/en/index/rfid/faqs/rfid.sub.-basics.htm- I, published at least before Sep. 8, 2011, 3 pages. cited by applicant.

RFIDREAD-4100, RFID Reader Module, modified Feb. 9, 2008, 5 pages. cited by applicant.

Technovelgy.com, "How RFID Works", available at http://www.technovelgy.com/ct/Technology-Article.asp?ArtNum=2, published at least before Sep. 8, 2011, 3 pages. cited by applicant.

\* cited by examiner

*Primary Examiner* — Jeffrey Shapiro

(74) *Attorney, Agent, or Firm* — Perkins Coie LLP

(57) ABSTRACT

Systems and associated methods for monitoring and/or controlling access to interior portions of consumer-operated kiosks and other enclosures are disclosed herein. In one embodiment, a consumer-operated kiosk includes an enclosure having a door movable between a closed position that prevents access to the enclosure and an open position that permits access to the enclosure. In this embodiment, an identifier, such as an RFID transponder or tag, is mounted to one of the enclosure or the door, and a reader, such as an RFID reader, is mounted to the other of the enclosure or the door. When the door is closed, the reader detects the identifier. Conversely, when the door moves away form the closed position, the reader ceases to detect the identifier and can generate/send a signal indicating that the door is open.

19 Claims, 7 Drawing Sheets

ACCESS MONITORING SYSTEMS FOR USE WITH CONSUMER-OPERATED KIOSKS AND OTHER ENCLOSURES

CROSS-REFERENCE TO RELATED APPLICATION

This application is a continuation of U.S. patent application Ser. No. 13/229,526, filed Sep. 9, 2011, and entitled "ACCESS MONITORING SYSTEMS FOR USE WITH CONSUMER-OPERATED KIOSKS AND OTHER ENCLOSURES," which is incorporated herein by reference in its entirety.

TECHNICAL FIELD

The present technology is generally related to the field of consumer-operated kiosks and, more particularly, to access security for such kiosks and other commercial enclosures.

BACKGROUND

There are numerous types of consumer-operated vending and service machines in use today, including food and drink vending machines, coin counting kiosks, DVD rental kiosks, etc. Various embodiments of consumer-operated kiosks are disclosed in, for example: U.S. Pat. Nos. 5,620,079, 6,494, 776, 7,584,869, 7,653,599, 7,748,619, 7,815,071, and 7,865, 432; and U.S. patent application Ser. Nos. 12/758,677, 12/806,531, 61/364,360 and 61/409,050; each of which is incorporated herein in its entirety by reference.

Many consumer-operated kiosks, vending machines, and other commercial sales/service/rental machines include a sturdy housing or enclosure that protects inventory, money, and/or internal workings from unauthorized access or theft. Service personnel, however, must be able to access such machines to restock inventory or consumables, remove money, perform maintenance and repairs, and perform other functions. For this reason, most kiosks include a lockable access door that requires a service personnel key to open. In addition, some doors can include a mechanical switch for recording door opening and closing times. These times can be compared to service personnel logs to ensure that only authorized personnel had access to the machine at all times.

One downside of mechanical door switches, however, is that they can often be easily bypassed or otherwise disabled without detection. Even some magnetic switches can be relatively easy to compromise with an appropriately-placed refrigerator magnet. Accordingly, it would be advantageous to provide a relatively simple access monitoring system that could not be easily defeated.

DETAILED DESCRIPTION

Figure 1:
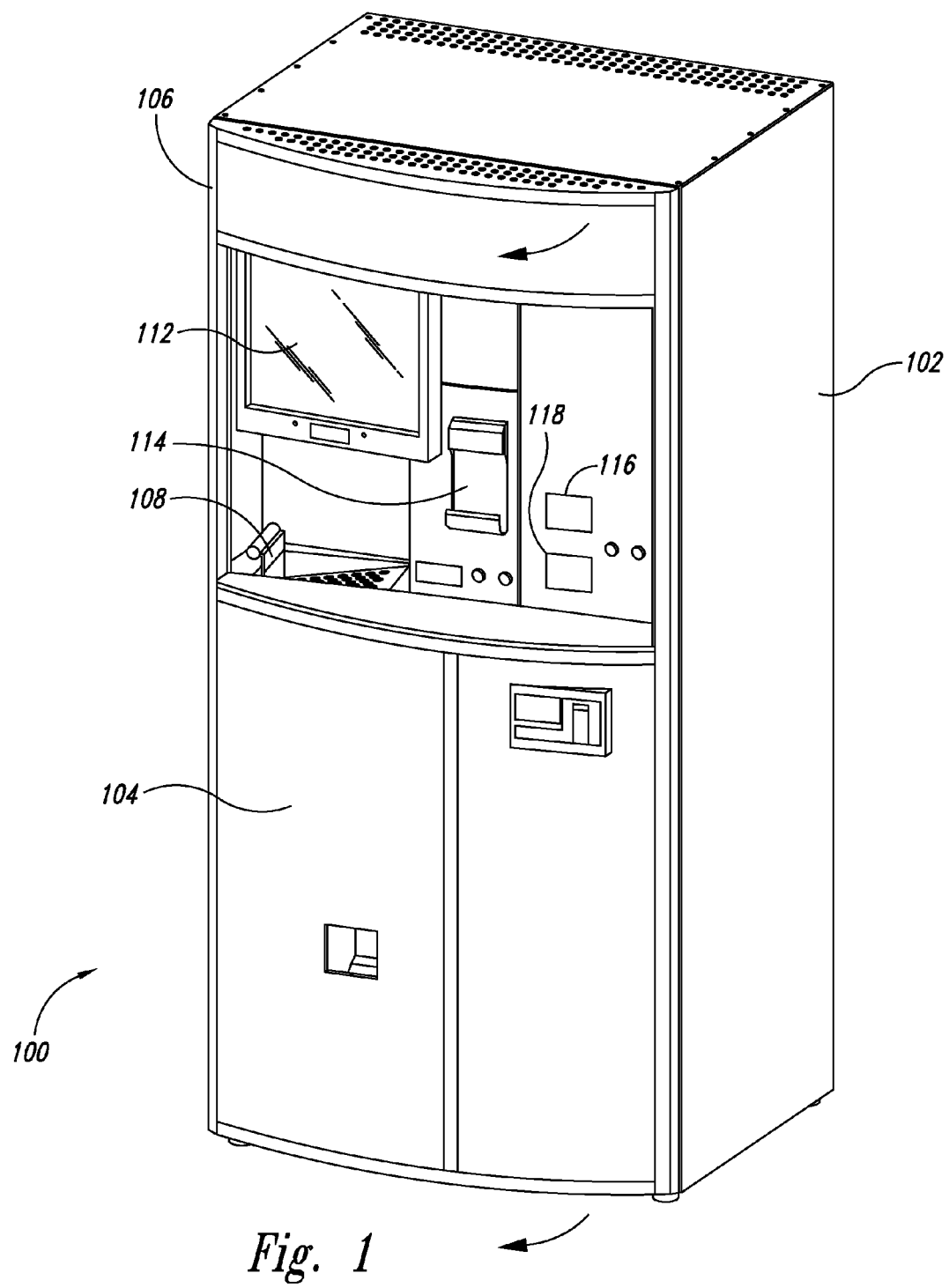
FIG. 1 is a front isometric view of a consumer-operated kiosk having an access monitoring system configured in accordance with an embodiment of the present technology.

The following disclosure describes various embodiments of systems and associated methods for monitoring, recording, and/or controlling access to consumer-operated kiosks and other enclosures. In one embodiment of the present invention, a consumer-operated kiosk (e.g., a consumer coin counting machine, prepaid card dispensing/reloading machine, DVD rental machine, etc.) includes an access door having a digital "smart switch" that utilizes wireless technology to determine door status (e.g., whether the door is opened or closed). In this embodiment, the digital door switch includes a digital identifier, such as a radio frequency identification (RFID) transponder or "tag" mounted to one of the machine enclosure or the door, and a wireless reader, such as an RFID reader, mounted to the other of the enclosure or the door. When the door is closed, the identifier moves into proximity of the reader and the reader detects the presence of the identifier. The presence of the identifier indicates that the door is in the closed position. Conversely, when the door is opened the identifier moves away from the reader so that the reader can no longer detect the presence of the identifier. The absence of the identifier indicates that the door is open.

In some embodiments, the reader can communicate door status information to a kiosk computer or other processing device, which can in turn record, for example, when the door is opened, when the door is closed, and how long the door remained open. Moreover, in some embodiments this access information can be uploaded to a computer located remotely from the kiosk (such as a computer located at a kiosk operating center) that may be connected to a network of similar kiosks. The access information for a particular kiosk can then be compared to service personnel access logs for that machine to ensure that only authorized persons had access to the kiosk at all times. Moreover, in the event that money or other items are found to be missing from a particular kiosk, the recorded access times can be used to ascertain who had access to the machine during the time period in question.

Some aspects of the present invention are described below in the general context of computer-executable instructions, such as routines executed by a general-purpose data processing device, e.g., a personal computer, RFID reader controller, server computer, and/or wireless device. Those skilled in the relevant art will appreciate, however, that some aspects of the invention can be practiced with other communications, data processing, or computer system configurations, including, for example: Internet appliances, hand-held devices (including personal digital assistants (PDAs)), wearable computers, all manner of cellular or mobile phones (including Voice over IP (VoIP) phones), dumb terminals, media players, multi-processor systems, microprocessor-based or programmable consumer electronics, set-top boxes, network PCs, mini-computers, mainframe computers, and the like. Indeed, the terms "computer," "controller," "server," "host," "host system," and the like are generally used interchangeably herein, and generally refer to any of the above devices and systems, as well as any data processor.

Aspects of the invention can also be embodied in a special purpose computer or data processor that is specifically programmed, configured, or constructed to perform one or more of the computer-executable instructions explained in detail herein. While some aspects of the invention, such as certain functions, may be described as being performed exclusively on a single device, the invention can also be practiced in distributed environments where functions or modules are shared among disparate processing devices which are linked through a communications network, such as a Local Area Network (LAN), Wide Area Network (WAN), or the Internet. In a distributed computing environment, program modules may be located in both local and remote memory storage devices.

Some aspects of the invention may also be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Certain details are set forth in the following description and in FIGS. 1-7B to provide a thorough understanding of various embodiments of the present technology. Other details describing well-known structures and systems often associated with coin counting kiosks, card dispensing/reloading kiosks, DVD rental kiosks and other consumer-operated machines and devices, as well as other details describing well-known structures and systems often associated with wireless (e.g., RFID) identification and reading devices, have not been set forth in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this detailed description.

The accompanying Figures depict embodiments of the present technology and are not intended to be limiting of its scope. The sizes of various depicted elements are not necessarily drawn to scale and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric front view of a consumer-operated kiosk 100 having an access monitoring system configured in accordance with an embodiment of the present technology. In the illustrated embodiment, the kiosk 100 is a consumer-operated coin counting machine that can include, for example, the ability to dispense redeemable vouchers, dispense and/or reload prepaid cards, dispense E-certificates for on-line purchases, transfer funds to accounts, and/or provide other products and services. By way of example, the kiosk 100 and various aspects thereof can be at least generally similar in structure and function to one or more of the kiosks operated by Coinstar Inc. of Bellevue, Wash., and/or one or more of the machines disclosed in U.S. Pat. Nos. 7,865,432, 7,815,071, and 6,494,776, each of which is incorporated herein in its entirety by reference.

In the illustrated embodiment, the consumer-operated kiosk 100 includes an external housing, such as an enclosure 102 having a hinged access panel, such as a front door 104. The door 104 is rotatably mounted to a corner portion of the enclosure 102 by a vertical hinge 106. The hinge 106 allows the door 104 to rotate between a closed position that prevents access to an interior portion of the enclosure 102 (as shown in FIG. 1) and an open position that permits access to the interior portion of the enclosure 102 (see FIG. 2).

In the illustrated embodiment, the kiosk 100 further includes a coin input region, such as a hinged coin input tray 108 in which the consumer can deposit his or her coins. A display screen 112 and associated user-selection buttons (e.g., a touch screen) enables the user to make selections and provide operating instructions to the kiosk 100. The kiosk 100 can also include a voucher outlet 114 from which the consumer can receive a redeemable voucher for all or a portion of the value of the deposited coins. In addition, the kiosk 100 can include a card outlet 116 from which the user can receive a new prepaid card (e.g., a prepaid phone card or prepaid credit card) for all or a portion of the coin value, and/or a card reader 118 with which the user can reload or "top-up" an existing prepaid card or an account with a portion of the coin value.

The kiosk 100 described above is merely representative of one type of consumer-operated kiosk, commercial enclosure, or other enclosure that can include the access monitoring systems described herein. In other embodiments, other types of consumer-operated kiosks, enclosures, and machines can include access monitoring systems configured in accordance with the present disclosure. Such machines can include, for example, DVD rental kiosks (such as those operated by Redbox Automated Retail, LLC of Oakbrook, Ill.), food vending machines such as coffee vending machines, card dispensing machines, consumer electronics vending machines, gift card exchange machines, cash registers, etc. Moreover, in other embodiments other kiosks and machines can include more, fewer, or different functionalities than those described herein. Indeed, as those of ordinary skill in the art will appreciate, the systems and methods described herein can be used with essentially any type of commerce-related or other enclosure to ascertain and/or record when a door or other access panel is opened and how long it remains open, and thereby provide security against theft and/or other types of unwanted access.

Figure 2:
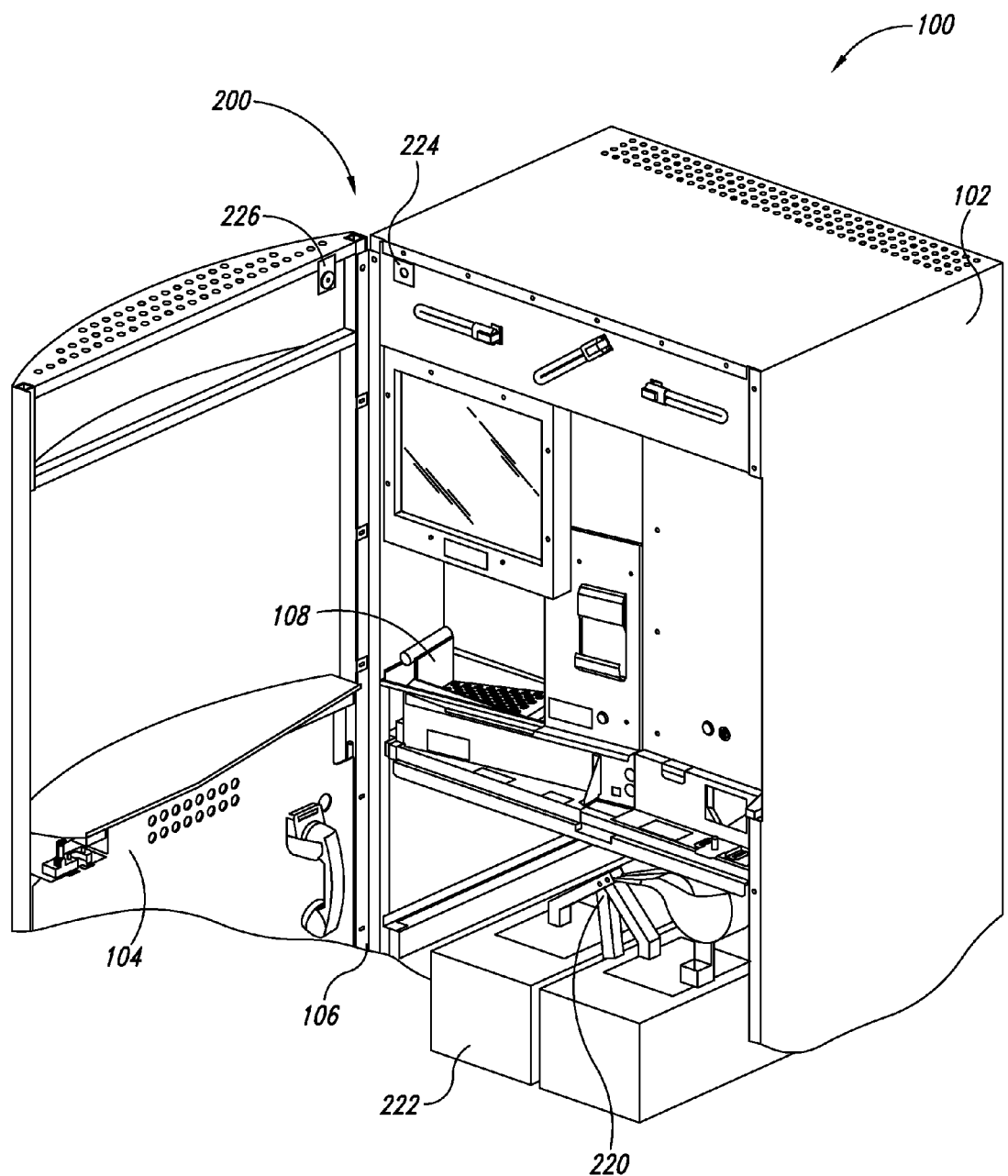
FIG. 2 is an enlarged front isometric view of a portion of the kiosk of FIG. 1 with a front door opened to illustrate aspects of the access monitoring system.

FIG. 2 is an enlarged front view of a portion of the kiosk 100 of FIG. 1 with the door 104 in an open position. Opening the door 104 provides access to a coin counting unit 220 and a corresponding coin collection bin 222. In the illustrated embodiment, the coin counting unit 220 receives coins from the coin input tray 108 and counts the coins before directing them into the coin bin 222. Service personnel can access the kiosk 100 via the door 104 to service the coin counting unit 220, to remove the coin bin 222, and/or to perform other needed tasks.

In the illustrated embodiment, the kiosk 100 includes an access monitoring system 200 that comprises an identification device or identifier 226 mounted to an upper inboard corner of the door 104 proximate the hinge 106, and a reading device or reader 224 mounted to an adjacent portion of the enclosure 102. In other embodiments, however, the reader 224 can be mounted to the door 104 while the identifier 226 is mounted to the enclosure 102. Moreover, it still further embodiments the identifier 226 and/or the reader 224 can be mounted in other locations on the door 104 and/or the enclosure 102. In one aspect of this embodiment, the identifier 226 and the reader 224 are positioned such that they will be aligned and proximate to each other, or at least generally aligned and proximate to each other, when the door 104 is securely closed and/or locked against the enclosure 102.

In the illustrated embodiment, the identifier 226 is a wireless identifier, such as an RFID transponder or "tag." In addition, in this embodiment the reader 224 is a wireless reader, such as an RFID reader. As described in greater detail below, in some embodiments the reader 224 can be operably connected (via, e.g., a USB port) to a kiosk computer for recording kiosk entry times, duration, and entering-person identification, and/or for communicating such information to a remote computer.

Figure 3A:
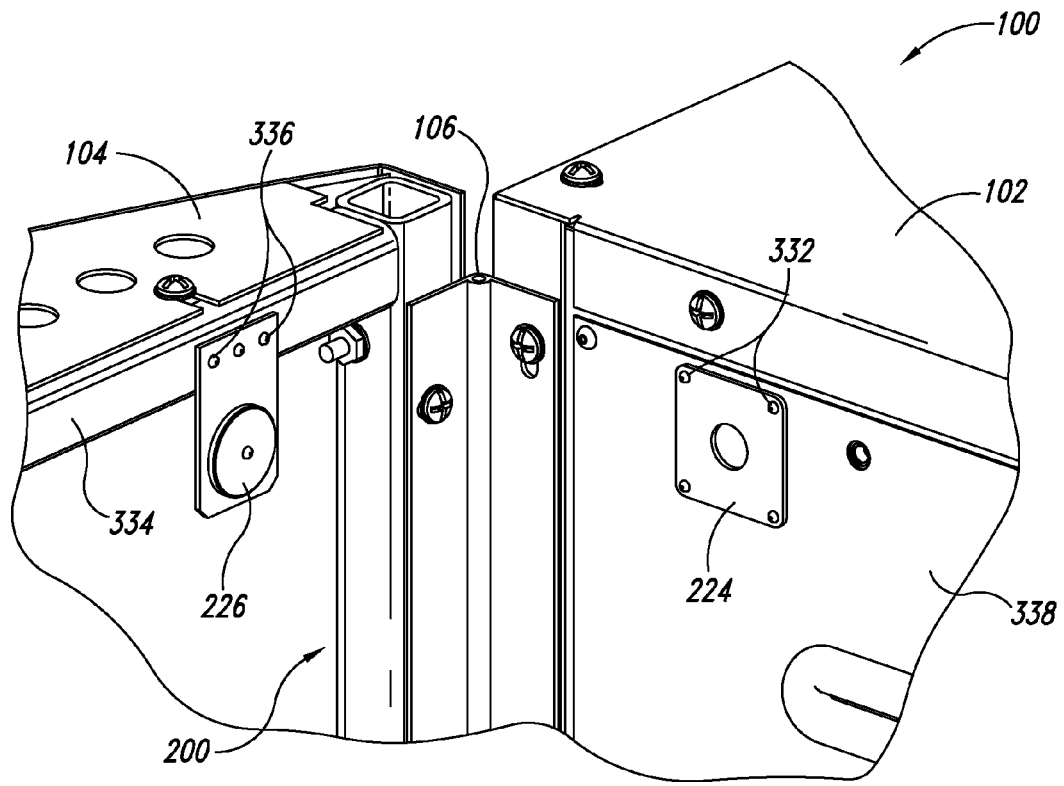
FIG. 3A is an enlarged isometric view taken from FIG. 2 illustrating additional aspects of the access monitoring system.
Figure 3B:
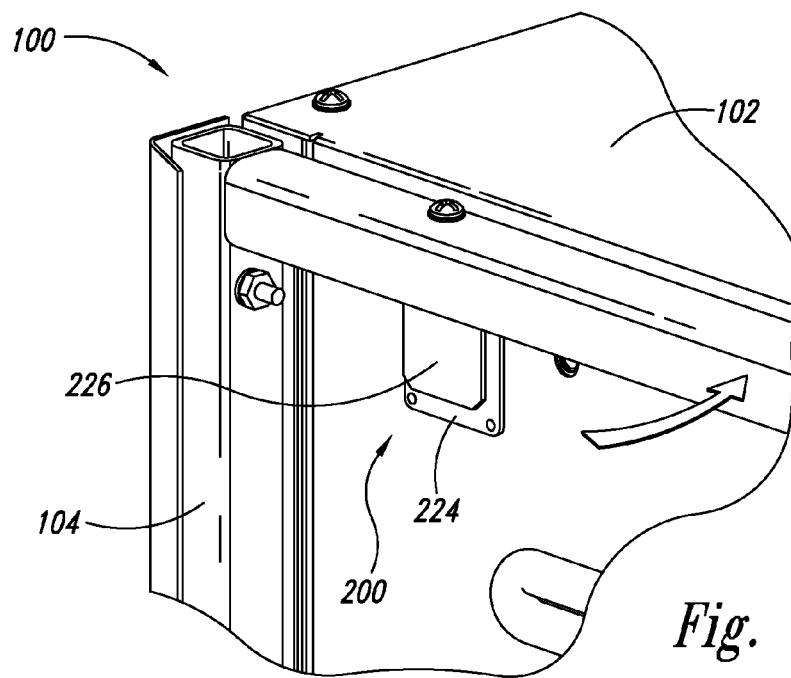
FIG. 3B is a similar isometric view of the consumer-operated kiosk with the front door closed.

FIG. 3A is an enlarged isometric view taken from FIG. 2 illustrating aspects of the access monitoring system 200 in more detail, and FIG. 3B is a similar isometric view of the consumer-operated kiosk 100 with the front door 104 closed. Some of the door structure (e.g., a door skin) has been removed from FIG. 3B for purposes of clarity. Referring first to FIG. 3A, in the illustrated embodiment the reader 224 (or, more specifically, a transceiver portion of the reader, such as the transceiver 431 described in more detail below with reference to FIG. 4) can be fastened to an upper front corner portion of the kiosk enclosure 102 (e.g., to a frame or chassis panel 338) with one or more fasteners 332 (e.g., rivets). The identifier 226 can be similarly attached to an adjacent portion of the door (e.g., a door frame member 334) by one or more fasteners 336. In this embodiment, the reader 224 can wirelessly sense or detect the presence of the identifier 226 when the door 104 is closed as shown in FIG. 3B and the identifier 226 is within the operational read range of the reader 224, but the reader 224 cannot detect the identifier 226 when the door 104 is opened as shown in FIG. 3A and the identifier 226 is outside the read range. As described in greater detail below, this enables the reader 224 to send a first signal to a kiosk computer (not shown) when the door 104 is opened, and a corresponding second signal to the kiosk computer when the door 104 is subsequently closed.

Although the illustrated embodiment includes a hinged door (i.e., the door 104), in other embodiments the access monitoring system 200 and/or one or more individual components, features and aspects thereof can be similarly implemented with other types of movable or removable access structures, including other types of doors (e.g., sliding doors), access panels (e.g., panels that can be entirely removed from the enclosure), etc. Accordingly, the systems and methods described herein are not limited to use with a particular type of door or other access structure.

Figure 4:
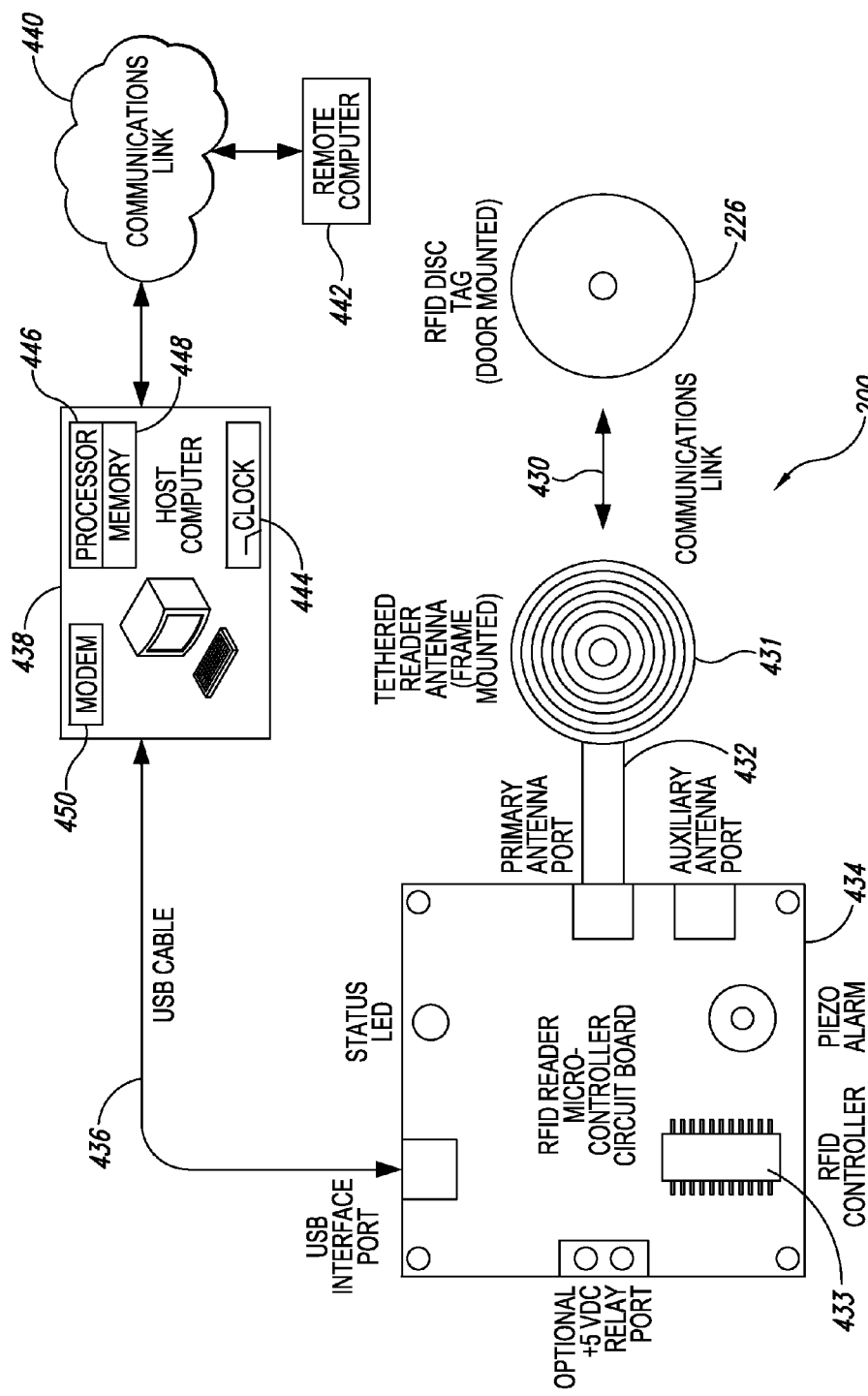
FIG. 4 is a partially schematic diagram illustrating various aspects of an access monitoring system configured in accordance with an embodiment of the present technology.

FIG. 4 is a schematic diagram of the access monitoring system 200 configured in accordance with an embodiment of the present technology. As mentioned above, in the illustrated embodiment the identifier 226 is a wireless identifier, such as a low cost, passive RFID transponder or RFID "tag" (for example, an EM4100 or EM4102 compatible RFID transponder). As is known, such tags can include an integrated circuit (IC) and a corresponding antenna (e.g., a small coil of wires). In the case of passive RFID tags, the tag does not contain a battery or other power source, and may be considered "low frequency" (e.g., 125/134 KHz) for use with "read only" RFID readers. The circuit of such tags is turned on by an electromagnetic field generated by the reader (in this case, the reader 224), and the circuit responds by sending information (e.g., 64 bits of information contained in a programmed memory array) back to the reader. Various embodiments of RFID tags suitable for use with the present technology can include one or more of the following features: a relatively small chip size, a relatively low power consumption, a read range of from about 2 inches to about 6 inches, such as about 3 inches, an operating frequency of from about 100 KHz to about 150 KHz, such as about 125 KHz, a laser programmable 64-bit memory array with data rate and coding options, an on-chip resonance capacitor, an on-chip supply buffer capacitor, an on-chip voltage limiter, an on-chip full wave rectifier, a relatively large modulation depth due to a low impedance modulation device, and/or other suitable features.

As also mentioned above, in the illustrated embodiment the reader 224 is a wireless reader, such as a 125 kHz EM4100 or EM4102 RFID reader module in a printed circuit board (PCB) form factor with a USB port for reading EM4100 or EM4102 compatible tags. The reader 224 can include a radio frequency (RF) transmitter and receiver ("transceiver") 431 for wireless communication 430 with the identifier 226. The transceiver 431 can be controlled by a micro processor and/or digital signal processor 433 mounted to a PCB 434. In the illustrated embodiment, the transceiver 431 is operably tethered or otherwise electronically connected to the circuit board 434 by a cable 432 (e.g., a USB cable that plugs into a USB port on the PCB 434). Moreover, in this embodiment the transceiver 431 is the portion of the reader 224 actually mounted to the outside of the kiosk panel 338 so that it faces the identifier 226 when the door 104 is closed (see FIGS. 3A and 3B). The PCB 434 can be suitably mounted inside the kiosk 100.

In the illustrated embodiment, the reader PCB 434 is operably connected to a host computer 438 (e.g., a central or main kiosk computer that controls all or a portion of the functions of the kiosk 100) via a communication link 436 (e.g., a USB cable). The communication link 436 enables the reader 224 to exchange information with and/or communicate information to the host computer 438. Such information can include, for example, what time the door 104 (FIG. 1) is opened, how long the door 104 remains open, and what time the door 104 is subsequently closed. The host computer 438 can be at least generally similar in structure and function to a personal computer, and can include a processor 446, memory 448, and a digital clock 444. Moreover, the host computer 438 can also include a communications facility (e.g., a modem 450) for exchanging information (such as door status information) with a remote computer 442 via a communication link 440, such as a plain old telephone system (POTS), a wireless communication link, the Internet, and/or a specialized network. The remote computer 442 can be associated with, for example, a central operations facility for managing operation of a network of kiosks. Such operations can include, for example, providing maintenance, restocking consumables, removing money, etc.

Figure 5:
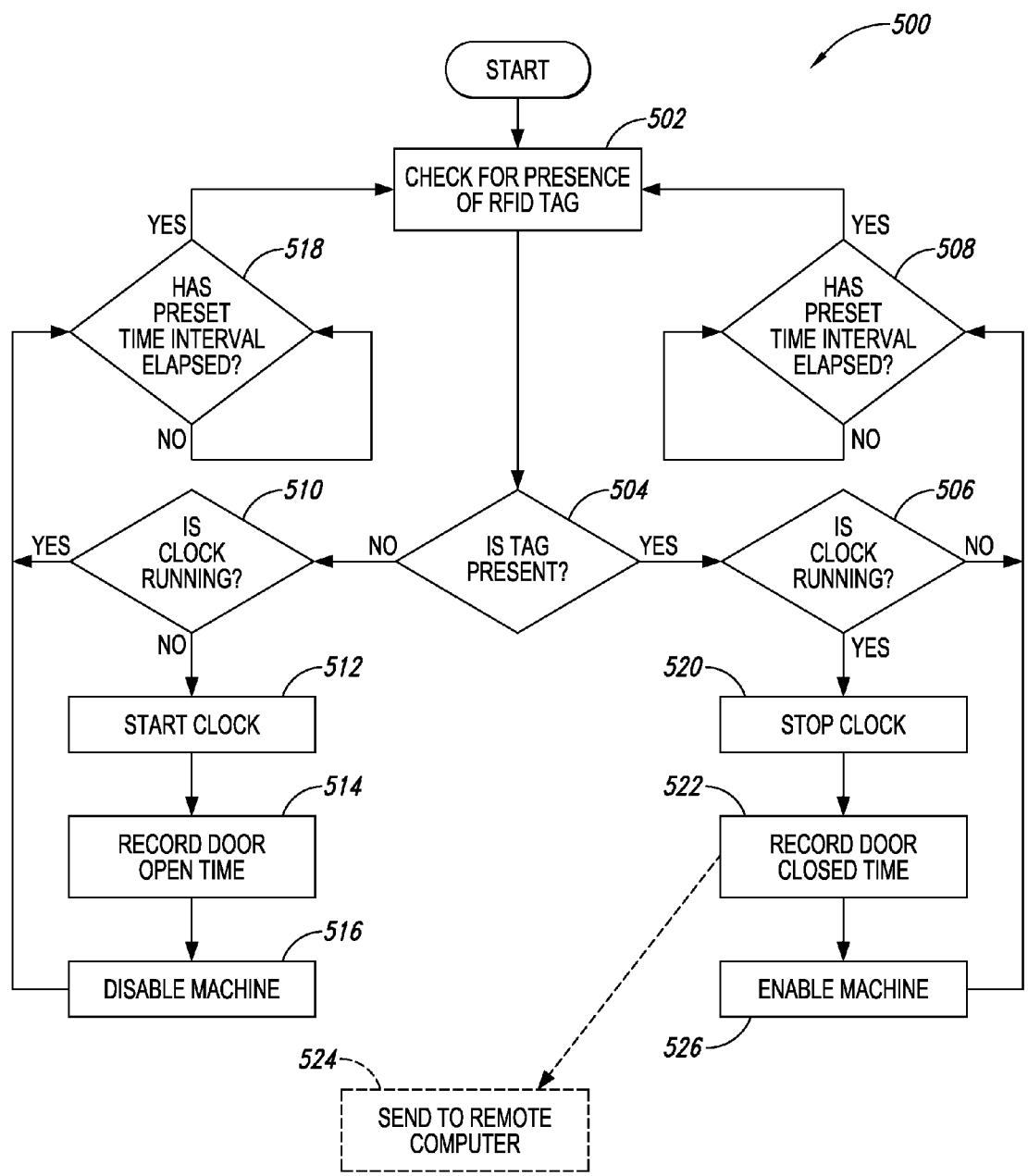
FIG. 5 is a flow diagram of a routine for monitoring access to a consumer-operated kiosk or other enclosure in accordance with an embodiment of the present technology.

FIG. 5 is a representative flow diagram illustrating a routine 500 for monitoring, recording, and/or controlling access to the consumer-operated kiosk 100 and/or other kiosks and enclosures in accordance with an embodiment of the present technology. The routine 500 or portions thereof can be performed by the host computer 438 and/or the reader 224 based at least in part on input from the identifier 226 (FIG. 4). The flow diagram 500 does not show all functions or exchanges of data, but instead provides an understanding of commands and data exchanged in some embodiments of the system. Those of ordinary skill in the art will recognize that some functions or exchange of commands and data may be repeated, varied, omitted, or supplemented, and other (e.g., less important) aspects not shown may be readily implemented.

The routine 500 starts in block 502 when a reader, e.g., the reader 224 checks for the presence of an RFID tag, e.g., the identifier 226. If the reader detects the presence of the tag in decision block 504 (indicating the door is closed), then the routine proceeds to decision block 506 to determine whether a clock (e.g., the clock 444 of FIG. 4) is running (indicating that the door 104 had previously been opened and the clock started). If the clock is not running, the routine proceeds to decision block 508 to determine if a preset interval of time has elapsed. The preset time interval can be a relatively short period of time (e.g., one second or less) that elapses between successive checks by the reader for the presence of the tag. In one embodiment, for example, the preset time interval can be shorter than the time typically required for a person to open the door. If the preset time interval has not elapsed, then the routine cycles through decision block 508 until the preset time interval has elapsed. Once the preset time interval has elapsed, the routine returns to block 502 and again checks for the presence of the tag.

Returning to decision block 504, if the tag is not present when the reader checks for it (indicating that the door is opened), then the routine proceeds to decision block 510 and determines if the clock is running. If the clock is not running, then the routine proceeds to block 512 and starts the clock. The routine also proceeds to block 514 and records the current time to reflect when the door was opened. In one aspect of this embodiment, in block 516 the routine can include the ability to disable all or a portion of the kiosk functionality when the door is opened. For example, if the access monitoring system described herein is used with a coin counting kiosk, the routine can disable the coin counting apparatus once the door is opened. This feature can prevent unscrupulous people from breaking into the machine and recycling the same portion of coins through the coin counting device to thereby obtain a redeemable voucher having a grossly inflated cash value. In other embodiments, the disabling feature of block 516 can be omitted.

After block 516, the routine proceeds to decision block 518 to determine if the preset period of time between checks for the presence of the tag has elapsed. Once the preset time interval has elapsed, the routine returns again to block 502 to again check for the presence of the tag. If the routine determines that the tag is still not present in decision block 504 (indicating that the door is still open), then the routine proceeds to decision block 510 where it accordingly determines that the clock is already running. From there the routine simply repeats the foregoing cycle and checks for the presence of the tag until such time as the routine determines that the tag is present in decision block 504 (indicating that the door has now been closed).

Once the routine determines that the tag is present in decision block 504, the routine proceeds to decision block 506 to determine if the clock is running. The clock will be running since it was turned on when the door was first opened, and therefore the routine proceeds to block 520 to stop the clock. From block 520 the routine proceeds to block 522 and records the time the clock is stopped, as this time corresponds to when the door is closed. In block 524, the routine 500 can optionally send a "timestamp" and/or other door access information to a remote computer, such as a computer located at a central operations headquarters remote from the coin counting kiosk. In some embodiments, a timestamp is a sequence of characters denoting the date and/or time at which a certain event occurred (e.g., a door was opened and/or the door was closed), and/or when the event is recorded by a computer. The timestamp can include, for example, information such as what time the door was opened, how long the door remained open, and when the door was closed. After block 522, the routine proceeds to block 526 and turns on or otherwise enables any portion of the machine functionality that was turned off in block 516. From block 526, the routine proceeds to decision block 508 and repeats as described above.

Timestamps from a particular kiosk can be used by, for example, a kiosk operator, in a number of different ways. For example, in one embodiment the timestamps can be compared to task logs of field technicians to ensure that only authorized persons had access to the kiosk during a particular period of time. Moreover, persons accessing the kiosk to remove, for example, collected coins, can also provide their entry logs for comparison to the timestamps to ensure that only approved personnel removed coins from a kiosk.

Each of the steps depicted in FIG. 5 can itself include a sequence of operations that need not be described herein. Those of ordinary skill in the art can create source code, microcode, and program logic arrays or otherwise implement the disclosed technology based on the flowchart of FIG. 5 and the detailed description provided herein. All or a portion of the routine 500 can be stored in the memory 448 (e.g., non-volatile memory) that forms part of the computer 438 (FIG. 4), or it can be stored in removable media, such as disks, or hardwired or preprogrammed in chips, such as EEPROM semiconductor chips.

Those of ordinary skill in the art will appreciate that the routine 500 and other functions and methods described herein can be performed by the computer 438, the reader 224, or both. The functions can be implemented by an application specific integrated circuit (ASIC), a digital signal processing (DSP) integrated circuit, through conventional programmed logic arrays or circuit elements. While many of the embodiments are shown and described as being implemented in hardware (e.g., one or more integrated circuits designed specifically for a task), such embodiments could equally be implemented in software and be performed by one or more processors (e.g., the processor 433 and/or the processor 446 of FIG. 4). Such software can be stored on any suitable computer-readable medium, such as microcode stored in a semiconductor chip, on a computer-readable disk, or downloaded from a server and stored locally at a client. Although specific circuitry may be described above, those of ordinary skill in the art will recognize that a microprocessor-based system could also be used where any logical decisions are configured in software.

Aspects of the access monitoring and security technology disclosed herein can be implemented in a number of useful embodiments. Such embodiments can include, for example:

1. Kiosk Door Security

This embodiment is described in detail above. When the door is opened the reader (e.g., the reader 224) no longer senses the tag (e.g., the identifier 226) and the system logs a "door open" time (via, e.g., the kiosk computer 438). When the door is closed the reader senses the tag and the system logs a "door closed" time. The door open and closed times can form a "timestamp" or timestamps for a particular kiosk. The timestamps can be uploaded daily to a remote headquarters computer along with other reporting information, or they can be electronically retrieved remotely from headquarters as needed. In the case of suspected kiosk tampering, additional steps can be taken such as placing a hidden camera (e.g., a video camera) in the kiosk and starting it to record images when the door is opened. Alternatively, a video camera can be running the entire time the machine is operating, and the timestamps can be correlated to the video to determine who had access to the machine during a particular time.

2. Kiosk Identification

In addition to providing security, in another embodiment an RFID tag may be mounted to the kiosk enclosure in such a way as to allow a person using a hand held device, such as a handheld RFID reader to sense the tag even if the kiosk is packaged for transit. The tag could therefore be used for inventory identification early in the kiosk build and assembly process and for tracking purposes thereafter.

3. Kiosk Component Identification

In this embodiment, an RFID reader or other reading device (e.g., a barcode scanner) could be mounted to a particular kiosk during assembly and used to read and record a unique ID number associated with each of the components (or at least the major components) used in the assembly of the kiosk. For example, during production assembly a tethered antenna could be plugged into the reader via a remote port and used to scan the RFID tags or other identifiers from the various internal components of the kiosk, such as a system computer, a coin counter, a coin cleaner, an LCD monitor, etc. Moreover, field technicians could be provided with an on-screen utility for removing and adding components to the kiosk. For example, a new component could be held up to the reader antenna and the unique RFID tag on the component read, and then the new component can be used to replace a malfunctioning or defunct component that is subtracted from the list of installed components. Similar to kiosk access information, this information could be uploaded to a remote system for inventory management, investigation and/or configuration control. Alternatively, the kiosk can be polled remotely from operation headquarters to obtain information about kiosk components on an as-needed basis.

4. Kiosk Access Control

In some of the foregoing examples, a door of a kiosk can be manually opened with a key or similar device, and a reader (e.g., an RFID reader) and an identifier (e.g., an RFID tag) can be used to log when and for how long the door was open. In other embodiments, however, the door can be latched shut with, for example, a solenoid driven lock that is electronically operated by detecting the presence of a particular identifier device. For example, in one embodiment personnel authorized to access the kiosk can be issued a unique "RFID key fob" (or other RFID tag or transponder device) that can be placed in a specified location on or near the kiosk to be read by a suitable reader mounted to the kiosk (e.g., an RFID reader). When the RFID key fob or similar device is suitably read by the reader, the reader transmits a signal to, e.g., the kiosk computer which activates the door opening solenoid to allow full, or at least limited access to the kiosk depending on the scope of access provided by the particular key fob code. One advantage of this approach is that if for any reason the key fob becomes lost or falls into the wrong hands, the unique code of the key fob could be remotely removed from active status via, e.g., a remote central operations computer, whereupon a new key fob would be issued to authorized personnel. This way, the lost key fob could not be used to open the door. In another aspect of this embodiment, the physical key could still be used to open the door, but the physical key would only be provided to an authorized field technician, whereas others would require the special key fob to open a particular kiosk. Although the foregoing example is described in the context of a key fob that contains a wireless identifier such as, for example, a RFID chip, in other embodiments an identifier such as an RFID chip can be included on a wallet sized card such as a credit card sized device, or on a bracelet worn on the user's wrist.

There are a number of advantages associated with various embodiments of the methods and systems described herein. One advantage, for example, is that a wireless kiosk access monitoring system as described herein can be relatively easily retrofitted to existing kiosks in the field. Moreover, the components of the system (e.g., an RFID tag or chip and an RFID reader) are relatively inexpensive components. In addition, in some embodiments these types of wireless identification systems can provide more security than a physical key, which can be easily copied. A further advantage of some embodiments is that a wireless access monitoring system can be remotely enabled and/or disabled via a communications link (e.g., the Internet) with a remote computer. Embodiments can also provide benefits such as remote access control, fraud prevention, access accountability, and configuration control as described in detail above.

The above description of various examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, although some embodiments have been described above in the context of consumer-operated kiosks, such as coin counting kiosks, in other embodiments the methods and systems disclosed herein can be used to monitor access and/or provide security for other commercially-related enclosures, such as prepaid card kiosks, DVD rental kiosks, vending machines, cash register drawers, etc. Moreover, although some embodiments have been described above in the context of RFID tags and RFID readers, in other embodiments other types of wireless technology can be used to monitor access door status. For example, in other embodiments a machine-readable code, such as a barcode, can be affixed to one of the door or the kiosk, and a scanner, such as a suitable infrared barcode scanner, can be affixed to the other of the door or the kiosk. The barcode and scanner can be positioned such that the scanner can "read" or suitably scan the bar code when the door is fully closed.

Figure 6:
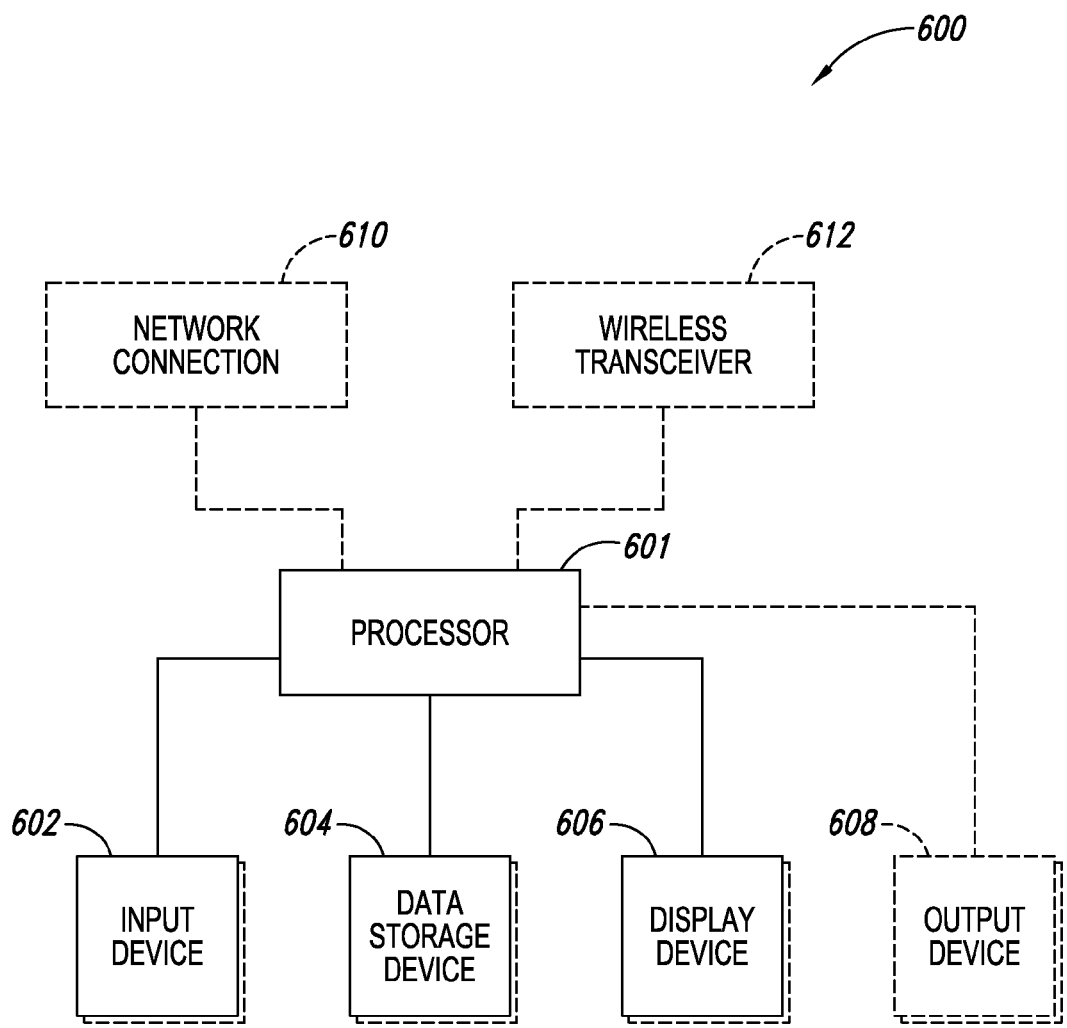
FIG. 6 is a block diagram of a suitable computer for implementing various aspects of the present technology.

FIG. 6 and the following discussion provide a brief, general description of a suitable computing environment in which aspects of the technology can be implemented. A computer 600, such as a kiosk computer, has one or more processors 601 coupled to one or more user input devices 602 and data storage devices 604. The computer is also coupled to at least one output device such as a display device 606 and one or more optional additional output devices 608 (e.g., printer, plotter, speakers, tactile or olfactory output devices, etc.). The computer may be coupled to external computers, such as via an optional network connection 610, a wireless transceiver 612, or both.

The input devices 602 may include a keyboard and/or a pointing device such as a mouse. Other input devices are possible such as a microphone, joystick, pen, game pad, scanner, digital camera, video camera, and the like. The data storage devices 604 may include any type of computer-readable media that can store data accessible by the computer 600, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 6).

Aspects of the technology may be practiced in a variety of other computing environments. For example, referring to FIG. 7A, a distributed computing environment with a web interface includes one or more user computers 702 in a system 700 are shown, each of which includes a browser program module 704 that permits the computer to access and exchange data with the Internet 706, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives), such as described above with respect to FIG. 6. User computers may include other program modules such as an operating system, one or more application programs (e.g., word processing or spread sheet applications), and the like. The user computers 102 include wireless computers, such as mobile phones, personal digital assistants (FDA's), palm-top computers, etc., which communicate with the Internet via a wireless link. The computers may be general-purpose devices that can be programmed to run various types of applications, or they may be single-purpose devices optimized or limited to a particular function or class of functions.

At least one server computer 708, coupled to the Internet or World Wide Web ("Web") 706, can perform much or all of the functions for receiving, routing and storing of electronic messages, such as web pages, audio signals and electronic images. While the Internet is shown, a private network, such as an intranet may likewise be used herein. The network may have a client-server architecture, in which a computer is dedicated to serving other client computers, or it may have other architectures such as a peer-to-peer, in which one or more computers serve simultaneously as servers and clients. A database 710 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL) password protection schemes, encryption, and the like).

The server computer 708 may include a server engine 712, a web page management component 714, a content management component 716 and a database management component 718. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data.

Figure 7A:
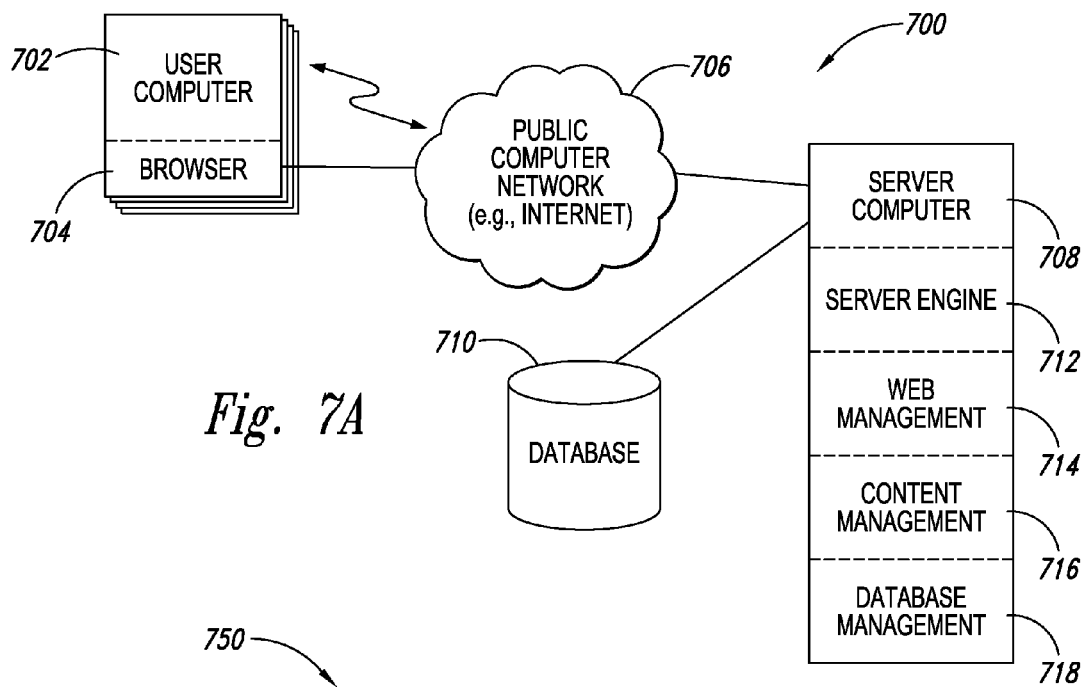
FIG. 7A is a block diagram illustrating a suitable system in which various aspects of the present technology may operate in a networked computer environment.
Figure 7B:
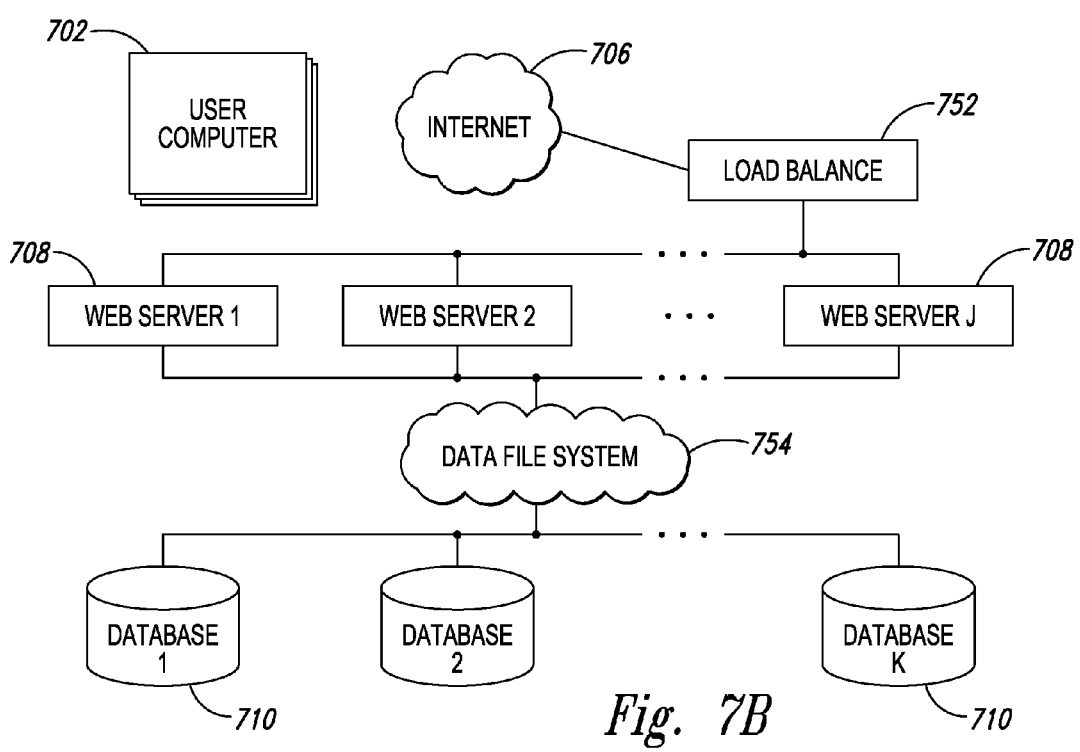
FIG. 7B is a block diagram illustrating an alternative system to that of FIG. 7A.

Referring to FIG. 7B, an alternative embodiment to the system 700 is shown as a system 750. The system 750 is substantially similar to the system 700, but includes more than one web server computer (shown as server computers 1, 2, . . . J). A web load balancing system 752 balances load on the several web server computers. Load balancing is a technique well-known in the art for distributing the processing load between two or more computers, to thereby more efficiently process instructions and route data. Such a load balancer can distribute message traffic, particularly during peak traffic times.

A distributed file system 754 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but does not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and functions of the various examples described above can be combined to provide further implementations of the invention. Some alternative implementations of the invention may include not only additional elements to those implementations noted above, but also may include fewer elements. Further, any specific numbers noted herein are only examples: alternative implementations may employ differing values or ranges.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method for monitoring access to a commercial enclosure, the commercial enclosure having a door movable between a closed position preventing access to an interior portion of the commercial enclosure and an open position permitting access to the interior portion of the commercial enclosure, the method comprising:
   attaching an identification device to one of the enclosure or the door;
   attaching a reading device to the other of the enclosure or the door;
   when the door is in the closed position, detecting the identification device with the reading device, and communicating first information from the reading device to a processor, wherein the first information is associated with the door being in the closed position;
   when the door is moved to the open position, communicating second information from the reading device to the processor, wherein the second information is associated with the door moving to the open position;
   in response to receiving the second information at the processor, starting a clock;
   in response to subsequently receiving the first information at the processor, stopping the clock; and
   recording the time interval between the starting of the clock and the stopping of the clock.

2. The method of claim 1 wherein detecting the identification device includes wirelessly detecting the identification device.

3. The method of claim 1 wherein attaching an identification device includes attaching an RFID tag, and wherein attaching a reading device includes attaching an RFID reader.

4. The method of claim 1 wherein attaching an identification device includes attaching an RFID tag to the door, and wherein attaching a reading device includes attaching an RFID reader to the enclosure.

5. The method of claim 1, further comprising:
   in response to receiving the second information at the processor, recording a time associated with the door moving to the open position.

6. The method of claim 1, further comprising:
   in response to receiving the second information at the processor, recording a time associated with the door moving to the open position; and
   communicating the time from the processor to a computer located remotely from the commercial enclosure.

7. The method of claim 1 wherein the commercial enclosure houses a machine for providing a consumer service, and wherein the method further comprises temporarily disabling the machine from providing the consumer service in response to receiving the second information at the processor.

8. The method of claim 1, further comprising sending the clock start time and the clock stop time to a computer located remotely from the commercial enclosure.

9. The method of claim 1, further comprising sending the time interval to a computer remotely from the commercial enclosure.

10. A method for monitoring access to a consumer-operated kiosk, the kiosk having an enclosure and a door movable between a closed position preventing access to an interior portion of the enclosure and an open position permitting access to the interior portion of the enclosure, the method comprising:
    attaching an identification device to one of the enclosure or the door;
    attaching a reading device to the other of the enclosure or the door;
    when the door is in the closed position, detecting the identification device with the reading device, and communicating first information from the reading device to a processor, wherein the first information is associated with the door being in the closed position;
    when the door is moved to the open position, communicating second information from the reading device to the processor, wherein the second information is associated with the door moving to the open position;
    in response to receiving the second information at the processor, starting a clock;
    in response to subsequently receiving the first information at the processor, stopping the clock; and sending at least one of the clock start time and a clock stop time to a computer located remotely from the kiosk.

11. The method of claim 10 wherein the kiosk houses a machine for providing a consumer service, and wherein the method further comprises temporarily disabling the machine from providing the consumer service in response to receiving the second information at the processor.

12. The method of claim 10 wherein the kiosk houses a machine for providing a consumer service, and wherein the method further comprises:
receiving a control signal from the remote computer in response to sending at least one of the clock start time and a clock stop time to the remote computer; and
temporarily disabling the machine from providing the consumer service in response to receiving the control signal from the remote computer.

13. The method of claim 10, further comprising:
associating at least one of the clock start time and a clock stop time with a kiosk identifier; and
sending the kiosk identifier to the computer located remotely from the kiosk.

14. The method of claim 10, further comprising:
determining an amount of time the door was open based on the clock start time and the clock stop time; and
sending the amount of time to the computer located remotely from the kiosk.

15. The method of claim 10, further comprising:
determining an amount of time the door was open based on the clock start time and the clock stop time;
associating the amount of time with a kiosk identifier; and
sending the amount of time and the kiosk identifier to the computer located remotely from the kiosk.

16. The method of claim 10 wherein attaching an identification device to one of the enclosure or the door includes positioning the identification device to render it inoperative when the door is in the open position.

17. The method of claim 10 wherein detecting the identification device with the reading device includes wirelessly receiving information from the identification device when the door is in the closed position.

18. The method of claim 10 wherein attaching an identification device includes attaching an RFID tag to one of the enclosure or the door, and wherein attaching a reading device includes attaching an RFID reader to the other of the enclosure or the door.

19. The method of claim 10 wherein attaching an identification device includes attaching an RFID tag to one of the enclosure or the door, and wherein attaching a reading device includes attaching an RFID reader to the other of the enclosure or the door directly in front of the RFID tag when the door is in the closed position.

* * * * *